(12) United States Patent
Xie et al.

(10) Patent No.: US 7,390,161 B2
(45) Date of Patent: Jun. 24, 2008

(54) COMPOSITE CONTAINMENT CASE FOR TURBINE ENGINES

(75) Inventors: Ming Xie, Beavercreek, OH (US); Stephen C. Mitchell, West Chester, OH (US); Donald G. LaChapelle, Cincinnati, OH (US); Michael Scott Braley, Cincinnati, OH (US); Gary D. Roberts, Wadsworth, OH (US); Dale Hopkins, Medina, OH (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 11/274,972

(22) Filed: Nov. 16, 2005

(65) Prior Publication Data

US 2006/0201135 A1    Sep. 14, 2006

Related U.S. Application Data

(63) Continuation-in-part of application No. 11/020,483, filed on Dec. 23, 2004, now Pat. No. 7,246,990.

(51) Int. Cl.
*F01D 21/00* (2006.01)
(52) U.S. Cl. ............ 415/9; 415/170.1; 415/174.4

(58) Field of Classification Search ............ 415/173.1, 415/173.4, 174.4, 170.1, 9
See application file for complete search history.

(56) References Cited

U.S. PATENT DOCUMENTS

| 5,437,538 | A * | 8/1995 | Mitchell | 415/9 |
| 6,428,280 | B1 | 8/2002 | Austin et al. | |
| 6,435,824 | B1 | 8/2002 | Schell et al. | |
| 6,561,760 | B2 | 5/2003 | Wadia et al. | |
| 7,018,168 | B2 * | 3/2006 | Worthoff et al. | 415/9 |
| 7,246,990 | B2 * | 7/2007 | Xie et al. | 415/9 |

* cited by examiner

*Primary Examiner*—Edward Look
*Assistant Examiner*—Dwayne J White
(74) *Attorney, Agent, or Firm*—William Scott Andes, Esq.; Armstrong Teasdale LLP

(57) ABSTRACT

A composite fan casing for a gas turbine engine includes, in an exemplary embodiment, a core having a plurality of core layers of reinforcing fiber bonded together with a thermosetting polymeric resin. Each core layer includes a plurality of braided reinforcing fiber tows. The braids of reinforcing fiber tows are aligned in a circumferential direction with each fiber tow including a plurality of reinforcing fibers. The core also includes at least one additional fiber tow braided into at least one predetermined axial location to form at least one concentrated stiffening ring.

11 Claims, 4 Drawing Sheets

COMPOSITE CONTAINMENT CASE FOR TURBINE ENGINES

CROSS REFERENCE TO RELATED APPLICATIONS

This application is a continuation-in-part of U.S. patent application Ser. No. 11/020,483, filed Dec. 23, 2004 now U.S. Pat. No. 7,246,990.

BACKGROUND OF THE INVENTION

This invention relates generally to gas turbine engines, and more particularly, to methods and apparatus for operating gas turbine engines.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

When engines operate in various conditions, foreign objects may be ingested into the engine. More specifically, various types of foreign objects may be entrained in the inlet of a gas turbine engine, ranging from large birds, such as sea gulls, to hailstones, sand and rain. The foreign objects may impact a blade resulting in a portion of the impacted blade being torn loose from a rotor. Such a condition, known as foreign object damage, may cause the rotor blade to pierce an engine casing resulting in cracks along an exterior surface of the engine casing, and possible injury to nearby personnel. Additionally, the foreign object damage may cause a portion of the engine to bulge or deflect resulting in increased stresses along the entire engine casing.

To facilitate preventing the increased engine stresses and the possible injury to personnel, at least some known engines include a metallic casing shell to facilitate increasing a radial and an axial stiffness of the engine, and to facilitate reducing stresses near the engine casing penetration. However, casing shells are typically fabricated from a metallic material which results in an increased weight of the engine and therefore the airframe.

The high specific strength and stiffness of polymeric composite materials offer attractive weight reduction benefits for jet engine components. The majority of current composite components are fabricated with material in a unidirectional tape or woven fabric form. The required properties needed for a specific component are achieved by assembling many layers of the chosen tape or woven fabric into one monolithic shell. Unfortunately these forms of composite material exhibit poor characteristics regarding crack propagation. Increasing the thickness of the component can reduce the stresses that initiate a crack to overcome this deficiency. However, this solution reduces or can eliminate any weight savings benefit of composite materials.

BRIEF DESCRIPTION OF THE INVENTION

In one aspect, a composite fan casing for a gas turbine engine is provided. The casing includes a core having a plurality of core layers of reinforcing fiber bonded together with a thermosetting polymeric resin. Each core layer includes a plurality of braided reinforcing fiber tows. The braids of reinforcing fiber tows are aligned in a circumferential direction with each fiber tow including a plurality of reinforcing fibers. The core also includes at least one additional fiber tow braided into at least one predetermined axial location to form at least one concentrated stiffening ring.

In another aspect, a method of fabricating a composite fan casing for a gas turbine engine is provided. The method includes forming a core, with the core including a plurality of core layers of reinforcing fiber bonded together with a thermosetting polymeric resin. Each core layer having a plurality of braided reinforcing fibers formed from tows of fibers, with the braids of reinforcing fibers aligned in a circumferential direction. The core also including at least one additional fiber tow braided into at least one predetermined axial location to form at least one concentrated stiffening ring.

In another aspect, a composite fan casing for a gas turbine engine is provided. The casing having a core that includes a plurality of core layers of reinforcing fiber bonded together with a thermosetting polymeric resin with each core layer including a mat of braided reinforcing fibers. The mat includes a plurality of reinforcing fiber tows braided together. Each fiber tow includes a plurality of reinforcing fibers. The core also includes at least one additional fiber tow braided into at least one predetermined axial location to form at least one concentrated stiffening ring.

DETAILED DESCRIPTION OF THE INVENTION

A composite fan casing for a gas turbine engine is described below in detail. The casing includes a core having a plurality of core layers of reinforcing fiber bonded together with a thermosetting polymeric resin. Each core layer includes a plurality of braided reinforcing fibers with the braids of reinforcing fibers aligned in a circumferential direction. The composite casing resists crack propagation under impact loading.

Figure 1:
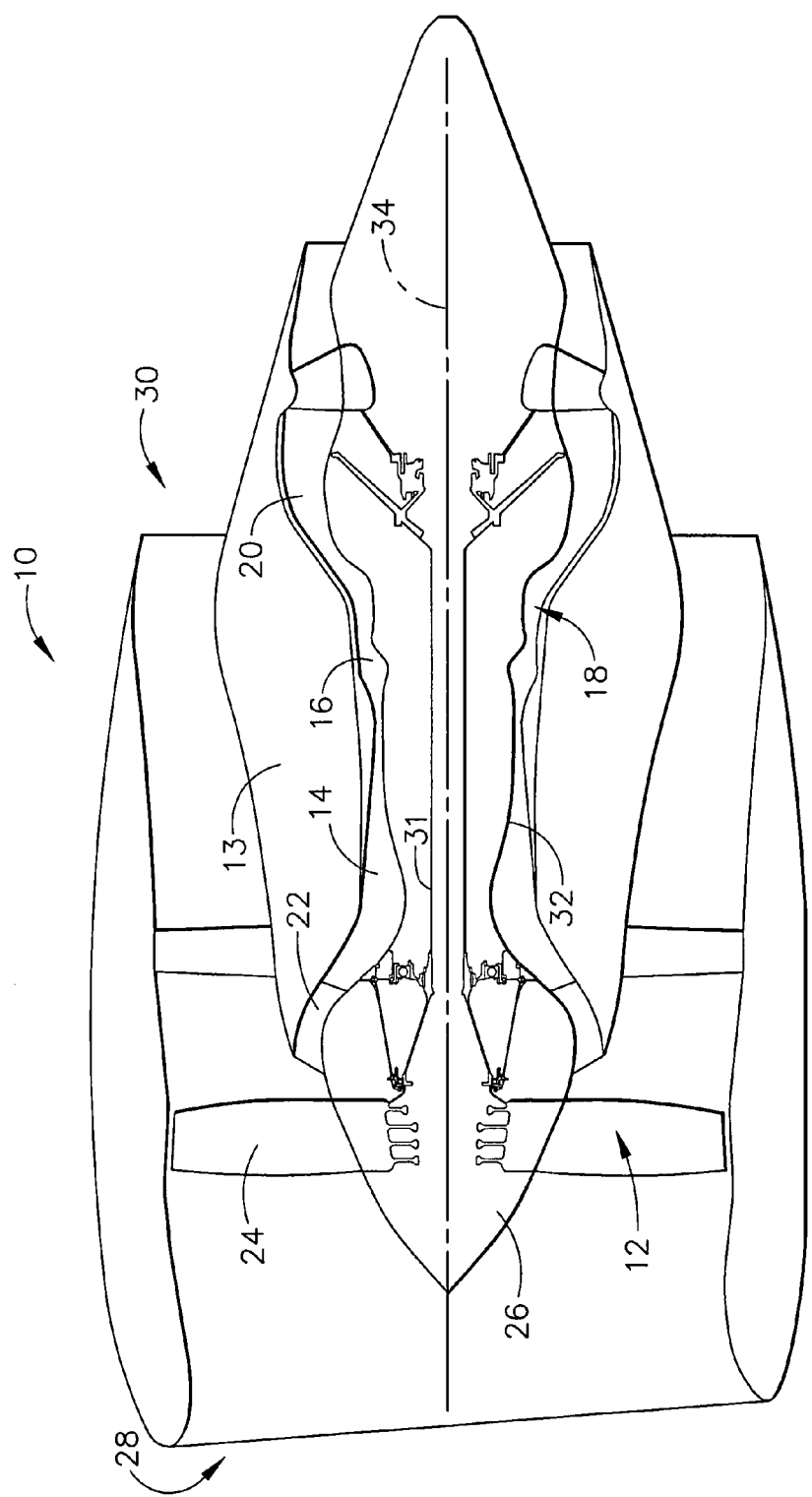
FIG. 1 is schematic illustration of a gas turbine engine.

Referring to the drawings, FIG. 1 is a schematic illustration of a gas turbine engine 10 that includes a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
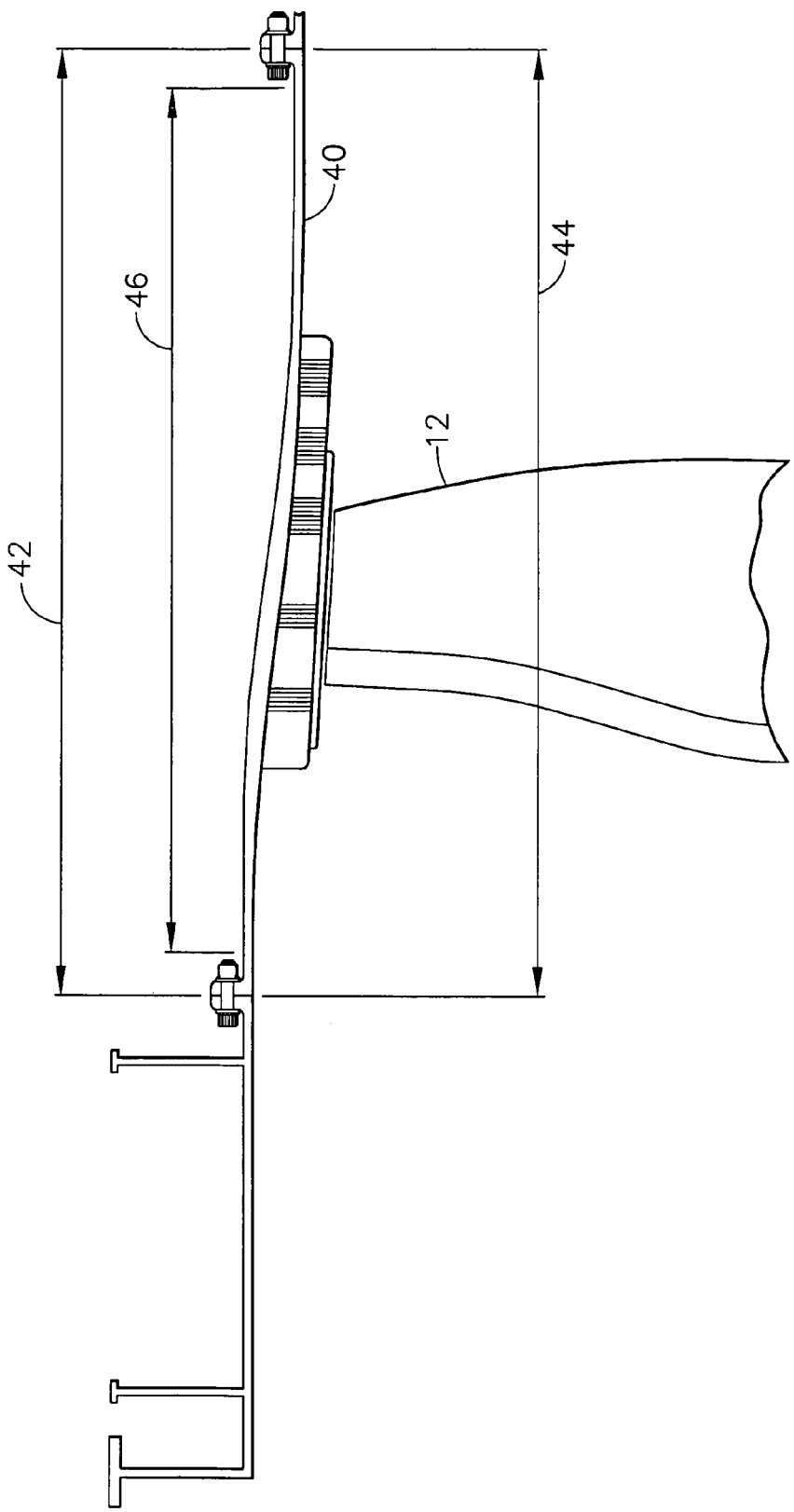
FIG. 2 is a schematic cross-section illustration of the fan containment case shown in FIG. 1.
Figure 3:
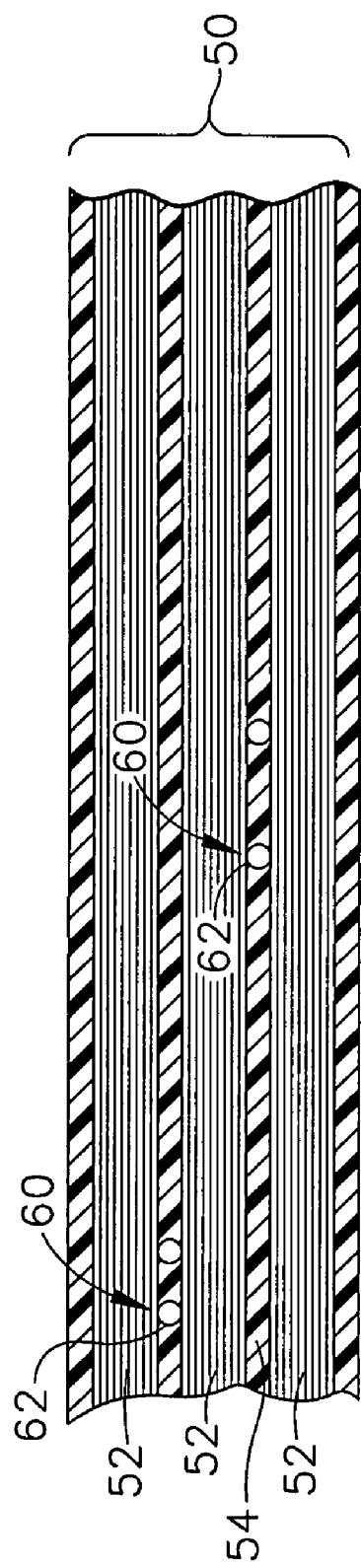
FIG. 3 is a schematic cross-section illustration of a portion of the fan containment case shown in FIG. 2 in accordance with an exemplary embodiment.

FIG. 2 is a schematic cross-section illustration of a fan containment casing 40, and FIG. 3 is a schematic cross-section illustration of a portion of fan containment case 40. Referring to FIGS. 2 and 3, in an exemplary embodiment, engine containment casing 40 is a hardwall containment system that includes a length 42 that is approximately equal to a fan assembly length 44. More specifically, length 42 is variably sized so that fan containment case 40 circumscribes a prime containment zone 46 of fan assembly 12. Prime containment zone as used herein is defined a zone extending both axially and circumferentially around fan assembly 12 where a fan blade is most likely to be ejected from fan assembly 12.

Figure 4:
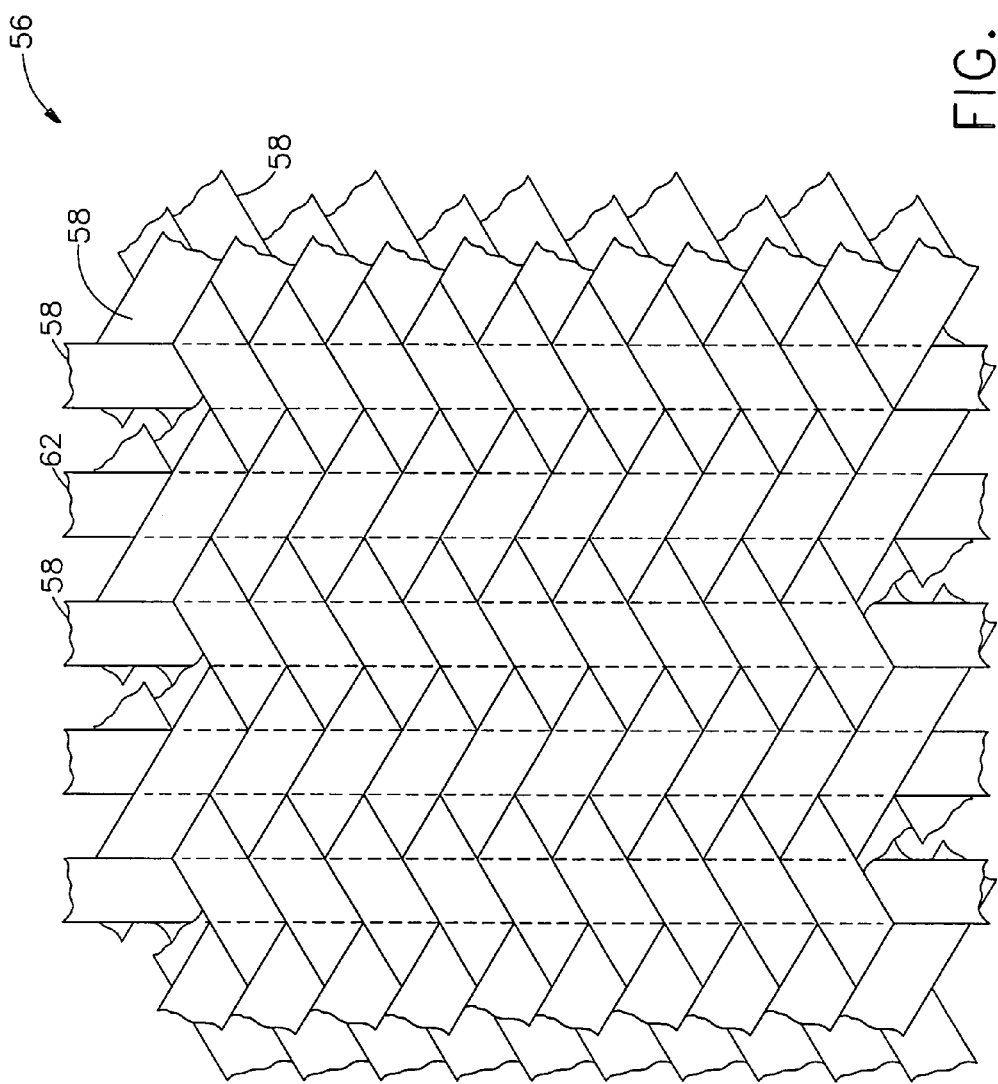
FIG. 4 is a schematic illustration of a braided mat of reinforcing fibers used to form the containment case shown in FIG. 2.

In the exemplary embodiment, containment casing 40 includes a core 50 that is formed by a plurality of core layers 52 of reinforcing fibers bonded together by a thermoset resin 54. Each core layer 52 includes a plurality of braids of the reinforcing fibers. Referring also to FIG. 4, in one embodiment, the reinforcing fibers are braided into a braided mat 56 where the braids are aligned to extend in a circumferential direction. The braids are formed by braiding fiber tows 58 containing about 10,000 to about 30,000 fibers per tow. In alternate embodiments fiber tows 58 can contain less than 10,000 fibers or greater than 30,000 fibers. However, the strength of core 50 is reduced when the tows contain less than 10,000 fibers, and the weight of containment casing 40 increases when fiber tows 58 contain greater than 30,000 fibers.

Fan containment casing 40 includes at least one integral stiffening ring 60 formed by additional fiber tows 62 located between core layers 52. The additional fiber tows 62 can also be braided into core layers 52 to fix their location in core 50 as shown in FIG. 4. Additional fiber tows 62 have a larger size than fiber tows 58 used to form braided mat 56. Particularly, additional fiber tows 62 contain greater than about 30,000 fibers, and in one embodiment additional fiber tows 62 contain at least about 50,000 fibers.

Any suitable reinforcing fiber can be used to form fiber tows 58 and 62 in core layers 52, including, but not limited to, glass fibers, graphite fibers, carbon fibers, ceramic fibers, aromatic polyamid fibers, for example poly(p-phenylenetherephtalamide) fibers (KEVLAR fibers), and mixtures thereof. Any suitable thermosetting polymeric resin can be used in forming core 50, for example, vinyl ester resin, polyester resins, acrylic resins, epoxy resins, polyurethane resins, and mixtures thereof.

Fan containment casing 40 is fabricated, in the exemplary embodiment, by bonding together core layers 52 together with thermosetting polymeric resin 54. Particularly, a mold is used to define the desired size and shape of containment casing 40. Core layers 52, fiber tows 62 of stiffening rings 60, and polymeric resin 54 are positioned in the mold. A vacuum is applied to the layered structure in the mold by any suitable method, for example vacuum bagging, and heat is applied to the structure to cure polymeric resin 54. Heat is applied to the layered structure by any suitable method, for example, by placing the layered structure in a heat chamber, oven or autoclave. The vacuum pulls polymeric resin into and impregnates fiber mats 56 of core layers 52 and fiber tows 62 of stiffening rings 60 to provide added strength to containment casing 40.

While the invention has been described in terms of various specific embodiments, those skilled in the art will recognize that the invention can be practiced with modification within the spirit and scope of the claims.

What is claimed is:

1. A composite fan casing for a gas turbine engine, said casing comprising a core, said core comprising:
   a plurality of core layers of reinforcing fiber bonded together with a thermosetting polymeric resin, each said core layer comprising a plurality of braided reinforcing fiber tows, said braided reinforcing fiber tows aligned in a circumferential direction, each said reinforcing fiber tow comprising a plurality of reinforcing fibers; and
   at least one additional fiber tow braided into at least one predetermined axial location to form at least one concentrated stiffening ring, said each additional fiber tow comprises a larger fiber count than said fiber tows that form said braids of reinforcing fibers.

2. A composite fan casing in accordance with claim 1 wherein each said core layer comprises a mat of braided reinforcing fiber tows.

3. A composite fan casing in accordance with claim 1 wherein said reinforcing fibers comprise at least one of carbon fibers, graphite fibers, glass fibers, ceramic fibers, and aromatic polyamid fibers.

4. A composite fan casing in accordance with claim 1 wherein said thermosetting polymeric resin comprises at least one of vinyl ester resins, polyester resins, acrylic resins, epoxy resins, and polyurethane resins.

5. A method of fabricating a composite fan casing for a gas turbine engine, said method comprises forming a core, the core comprising:
   a plurality of core layers of reinforcing fiber bonded together with a thermosetting polymeric resin, each core layer comprising a plurality of braided reinforcing fibers formed from tows of fibers, the braids of reinforcing fibers aligned in a circumferential direction; and
   at least one additional fiber tow braided into at least one predetermined axial location to form at least one concentrated stiffening ring, said each additional fiber tow comprises a larger fiber count than said fiber tows that form said braids of reinforcing fibers.

6. A method in accordance with claim 5 wherein forming a core comprises forming a core having a plurality of core layers of braided reinforcing fiber mats bonded together with a thermosetting polymeric resin.

7. A method in accordance with claim 5 wherein the reinforcing fibers comprise at least one of carbon fibers, graphite fibers, glass fibers, ceramic fibers, and aromatic polyamid fibers.

8. A method in accordance with claim 5 wherein the thermosetting polymeric resin comprises at least one of vinyl ester resins, polyester resins, acrylic resins, epoxy resins, and polyurethane resins.

9. A composite fan casing for a gas turbine engine, said casing comprising a core, said core comprising:
   a plurality of core layers of reinforcing fiber bonded together with a thermosetting polymeric resin, each said core layer comprising a mat of reinforcing fibers, said mat comprising a plurality of reinforcing fiber tows braided together, each said reinforcing fiber tow comprising a plurality of reinforcing fibers; and
   at least one additional fiber tow braided into at least one predetermined axial location to form at least one concentrated stiffening ring, said each additional fiber tow comprises a larger fiber count than said fiber tows that form said braids of reinforcing fibers.

10. A composite fan casing in accordance with claim 9 wherein said reinforcing fibers comprise at least one of carbon fibers, graphite fibers, glass fibers, ceramic fibers, and aromatic polyamid fibers.

11. A composite fan casing in accordance with claim 9 wherein said thermosetting polymeric resin comprises at least one of vinyl ester resins, polyester resins, acrylic resins, epoxy resins, and polyurethane resins.

* * * * *